United States Patent [19]

Petrich et al.

[11] Patent Number: 5,192,465
[45] Date of Patent: Mar. 9, 1993

[54] METHOD OF AND APPARATUS FOR LIQUID DISTRIBUTION

[75] Inventors: Tullio Petrich, Rome; Paolo Martinenghi, Pavia, both of Italy

[73] Assignee: Glitsch, Inc., Dallas, Tex.

[21] Appl. No.: 650,747

[22] Filed: Feb. 5, 1991

[51] Int. Cl.$^5$ .............................................. B01F 3/04
[52] U.S. Cl. ............................................................. 261/97
[58] Field of Search ................................ 261/97, 110

[56] References Cited

U.S. PATENT DOCUMENTS

| | | |
|---|---|---|
| 2,582,826 | 1/1952 | Glitsch . |
| 2,611,596 | 9/1952 | Glitsch . |
| 3,008,553 | 11/1961 | Glitsch et al. . |
| 3,013,782 | 12/1961 | Glitsch . |
| 3,019,003 | 1/1962 | Glitsch . |
| 3,037,754 | 6/1962 | Glitsch . |
| 3,079,134 | 2/1963 | Winn . |
| 3,080,155 | 3/1963 | Glitsch et al. . |
| 3,087,711 | 4/1963 | Glitsch . |
| 3,233,708 | 2/1966 | Glitsch . |
| 3,343,821 | 9/1967 | Winn et al. . |
| 3,360,246 | 12/1967 | Eckert ................................ 261/97 |
| 3,392,967 | 7/1968 | Eckert ................................ 261/97 |
| 3,937,769 | 2/1976 | Stringle, Jr. et al. ............ 261/97 |
| 3,959,419 | 5/1976 | Kitterman . |
| 3,969,447 | 7/1976 | Glitsch et al. . |
| 4,086,307 | 4/1978 | Glaspie . |
| 4,120,919 | 10/1978 | McClain . |
| 4,123,008 | 1/1978 | McClain . |
| 4,165,040 | 8/1979 | Beacham et al. . |
| 4,198,002 | 4/1980 | McClain . |
| 4,264,538 | 4/1981 | Moore et al. . |
| 4,267,978 | 5/1981 | Manteufel . |
| 4,472,325 | 9/1984 | Robbins . |
| 4,476,069 | 10/1984 | Harper et al. . |
| 4,479,909 | 10/1984 | Streuber . |
| 4,557,877 | 12/1985 | Hofstetter . |
| 4,592,878 | 6/1986 | Scrivnor ............................ 261/97 |
| 4,597,916 | 7/1986 | Chen . |
| 4,604,247 | 8/1986 | Chen et al. . |
| 4,689,183 | 8/1987 | Helms et al. . |
| 4,715,537 | 12/1987 | Calder . |
| 4,729,857 | 3/1988 | Lee et al. . |
| 4,808,350 | 2/1989 | Robbins et al. ................. 261/97 |
| 4,842,778 | 6/1989 | Chen et al. . |
| 4,909,967 | 3/1990 | Binkley et al. . |
| 4,950,430 | 8/1990 | Chen et al. . |
| 4,956,127 | 9/1990 | Binkley et al. . |
| 4,981,265 | 1/1991 | Buhlmann ........................ 261/97 |
| 4,994,210 | 2/1991 | Lucero et al. .................... 261/97 |
| 5,051,214 | 9/1991 | Chen et al. ....................... 261/97 |
| 5,061,407 | 10/1991 | Nutter ............................... 261/97 |

FOREIGN PATENT DOCUMENTS 3409524 9/1985 Fed. Rep. of Germany ........ 261/97

OTHER PUBLICATIONS

G. K. Chen, "Packed Column Internals," Chemical Engineering, Mar. 5, 1984 (Reprint).

Primary Examiner—Tim Miles
Attorney, Agent, or Firm—Johnson & Gibbs

[57] ABSTRACT

A distributor assembly comprising a distributor plate adapted for horizontal positioning and securement to a process column liquid distributor for the symmetrical discharge of liquid therefrom. The distributor plate comprises a member having side walls formed therearound and a plurality of apertures formed therein. The distributor plate is constructed for collecting liquid discharged from the liquid distributor, spreading the liquid thereacross and affording low velocity equal discharge of liquid therefrom into a packing bed therebeneath.

25 Claims, 5 Drawing Sheets

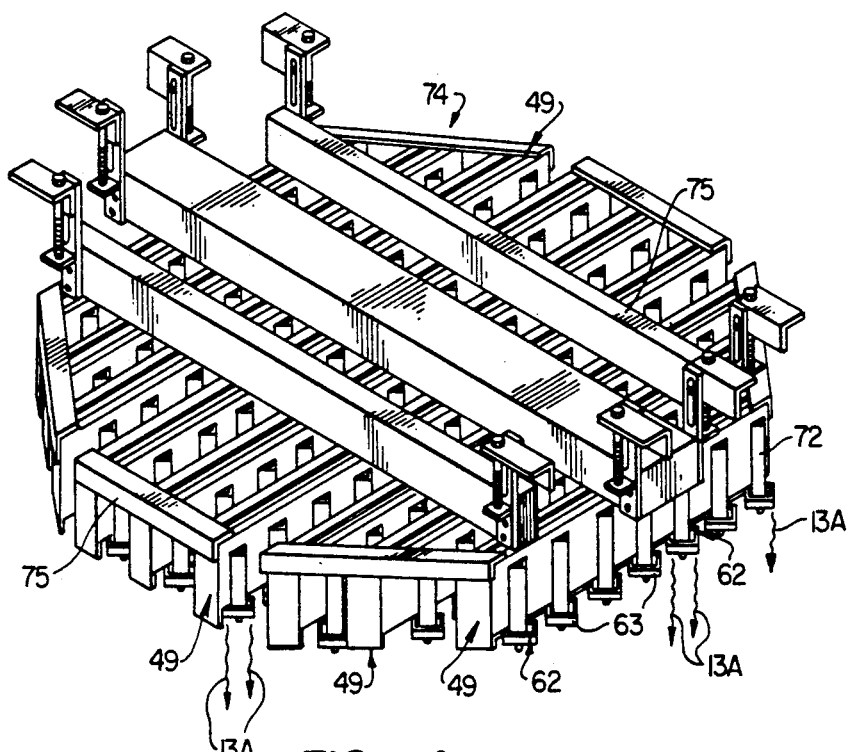
FIG. 4
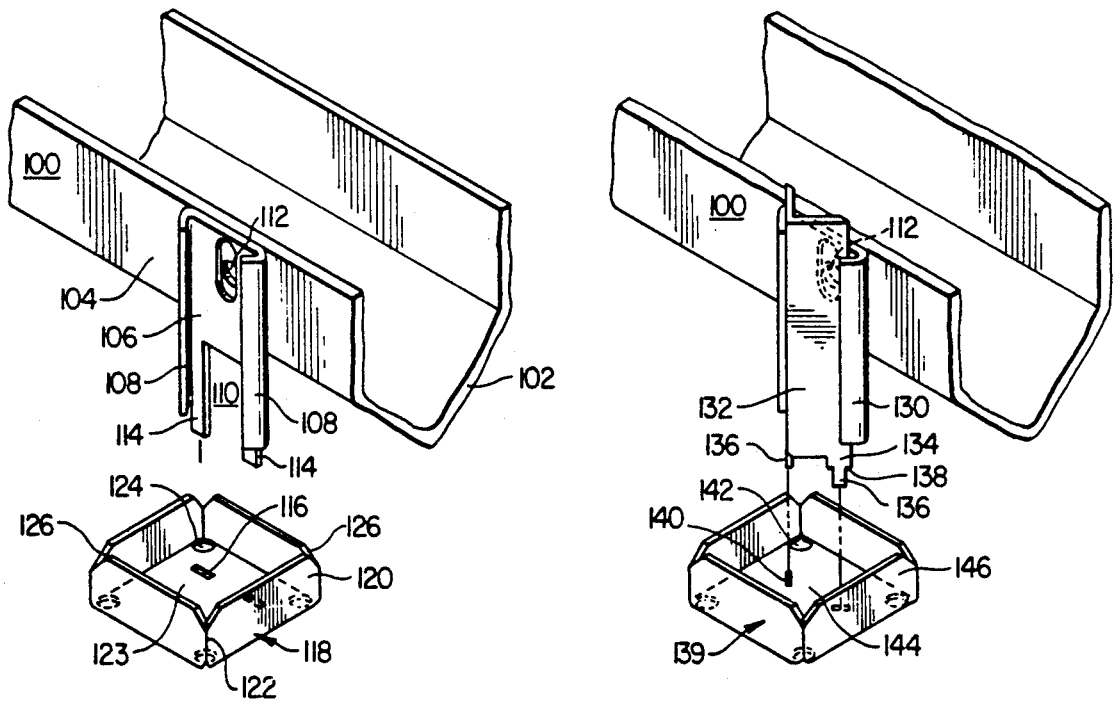
FIG. 5
FIG. 6

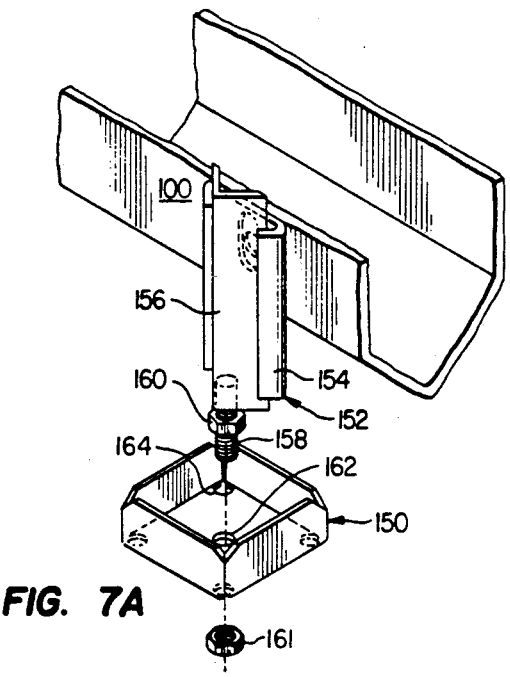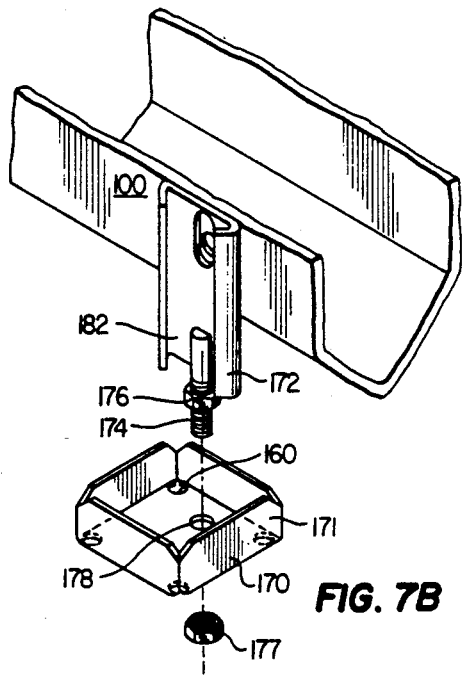
FIG. 7A    FIG. 7B
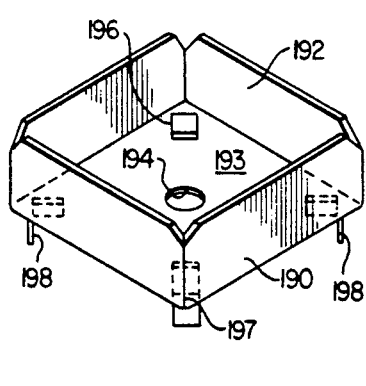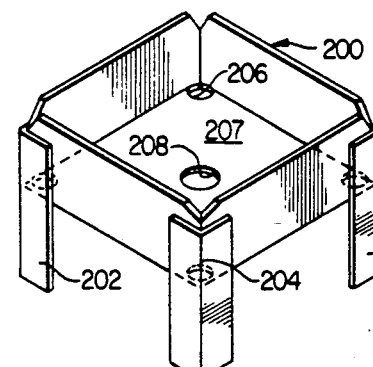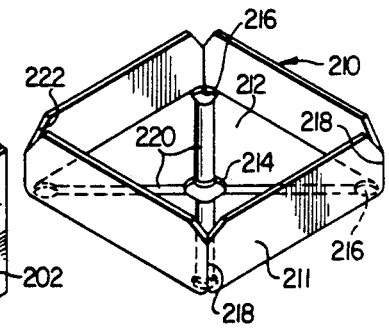
FIG. 9    FIG. 10    FIG. 11
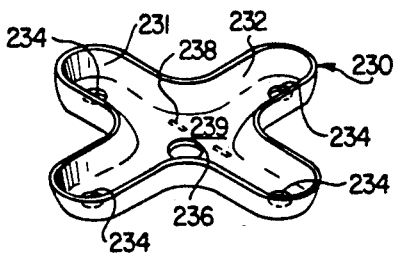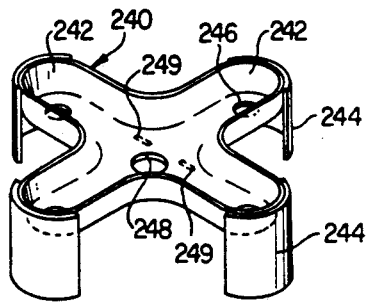
FIG. 12    FIG. 13

METHOD OF AND APPARATUS FOR LIQUID DISTRIBUTION

BACKGROUND OF THE INVENTION

1. Field of the Invention

The present invention relates to liquid distributors for process plant towers and, more particularly, to an improved liquid distributor drip point multiplier.

2. History of the Prior Art

It is well known in the prior art to utilize various types of exchange columns in which a gas and a liquid come into contact with one another, preferably in a counter-current flow for purposes of mass or heat transfer, close fractionation and/or separation of feed stock constituents, and other unit operations. Efficient operation requires mass transfer, heat transfer, fluid vaporization and/or condensation, whereby one of the fluids can be cooled with a minimum pressure drop through and in a particular zone or zones of minimum dimensions defining the area and volume thereof. These are pre-requisites of efficient operation and are necessary for close fractionation. For this reason, counter-current flow of vapor and liquid within such exchange columns have become established methods of such vapor-liquid contact in the prior art. The actual vapor-liquid mass transfer interface requires the utilization of a packing bed within the column. Liquid is then distributed atop the packing bed in the most feasible manner while vapor is distributed beneath the packing bed in the lower region of the tower. In this manner liquid trickling downwardly through the packing bed is exposed to the vapor ascending therethrough for vapor-liquid contact and interaction.

It is well established that the configuration of the packing bed determines the pressure drop, the vapor-liquid interface area and the concomitant mass and energy transfer occurring in a process tower. The means for effective and even distribution of the vapor and the liquid on opposite ends of the packing bed, as well as maintenance of that distribution therethrough, is critical to an efficient operation. Only with efficient initial vapor and liquid distribution and the maintenance of said distribution throughout the packing bed will homogenous mixing zones be created therethrough for maximizing the efficiency therein. Efficiency is readily convertible to cost of operation and production quality. For this reason, a myriad of prior art packing designs have been prevalent in conventional exchange columns. The efficiency of the packing is, however, limited to a large extent by the efficiency of the vapor and liquid distribution thereacross. For example, failure of either vapor or liquid to evenly distribute over cross sections of the packing effectively eliminates the utility of the part of the packing where there is poor or no distribution which, in turn, is directly proportional to the efficiency and cost effectiveness of the operation. The packing bed depths are critical in establishing production criteria and operational costs, and failure to evenly distribute vapor-liquid and/or maintain homogeneity within the packing bed can lead to serious consequences in any mass transfer operation.

Aside from the packing beds themselves, the liquid distributor is the most important unit of a tower internal. Failure in performance of a packed tower sometimes stems from liquid distribution problems such as clogging or uneven distribution, and thus the selection of a correct liquid distributor is critical for uninterrupted plant operation. Operational considerations thus include the functional aspects of the distributor, such as how will level in the distributor troughs be maintained, how well the floor is leveled therethrough, and the manner in which the liquid is distributed from the troughs to the packing beds therebeneath. Also considered is the effect which the ascending vapor has on the liquid being distributed. When vapor flow areas are restricted, flow velocity can increase to the point of interrupting the descending liquid flow pattern. The liquid is, in essence, "blown" around, and this condition can lead to uneven distribution and inefficiency in the process column.

Conventional liquid distributors generally include the multi-orifice troughs or pipes for dispersing liquid in the form of liquid streams or sprays atop a packing bed. In the utilization of dump packing wherein a plurality of randomly oriented packing elements are disposed, within the exchange column, such a liquid distribution technique is sometimes effective. This is true particularly when high efficiency parameters are not of critical significance. However, in the event of high efficiency packing such as that set forth in U.S. Pat. No. 4,604,247 assigned to the assignee of the present invention, means for homogeneous liquid and gas distribution are of extreme importance.

The cost of high efficiency packing of the type set forth in the aforesaid patent commands attention to proper vapor-liquid distribution. Even small regions of non-homogenous interaction between the vapor and liquid are an expensive and wasteful loss not consistent with the utilization of high efficiency packing, where space and homogeneity in vapor-liquid interface is both expected and necessary for proper operation. High efficiency packing of the state-of-the-art varieties set forth and shown in the aforesaid U.S. patent requires counter-current vapor-liquid flow through the channels defined by opposed corrugations of sheets disposed therein. If the initial liquid or gas distribution fails to enter a particular corrugation pattern, then precious wet surface area is lost in the packing until the liquid and vapor are urged to migrate into, and interact through, the unwetted regions of the packing. Only by utilizing proper vapor and liquid distribution means may effective and efficient utilization of high efficiency packing, as well as conventional dumped packing, be assured.

The development of systems for adequate liquid distribution in process towers has been generally limited as set forth above. In the main, it is known to discharge and distribute liquids with spray nozzles, pipes, perforated plates, and troughs, some of which further incorporate apparatus for increasing the number of drip points along the sides thereof. U.S. Pat. Nos. 4,479,909, 4,264,538 and 4,689,183 each illustrate such assemblies. Such devices have been used because gas is concomitantly discharged in an ascending turbulent configuration in a tower with a goal to provide adequate vapor distribution therein.

Although many prior art systems re generally effective in distributing some vapor and some liquid to most portions of the packing bed, uniform distribution thereacross is usually not obtained without more sophisticated distribution apparatus. For example, unless gas is injected into a myriad of contiguous areas beneath the packing bed with equal pressure in each area, the mass flow of vapor upwardly though the packing bed cannot be uniform. Random vapor discharge simply distributes unequal amounts of vapor across the lower regions of the packing bed but does not in any way assure equality in the distribution. Likewise, the simple sprays of liquid atop the packing bed, though intended to be effective in wetting all surface areas, result in high concentrations of liquid flow in certain packing bed areas and less flow in others. This, of course, depends on the number and type of spray devices. Orifice distributors are generally more susceptible to plugging than other types of distributors, and plugging is generally non-uniform, leading to uneven irrigation within the tower. Any flow irregularity which focuses the flow in one area while reducing flow in other areas is deleterious.

It has been discovered that with pipe distributors consisting of headers equipped with tributary pipes or laterals that have small holes or spray nozzles to distribute liquid, the liquid is often distributed too finely. Tiny drops of the liquid then get carried out of the tower by counter-current gas flow. This prevents the liquid from even coming in contact with the packing bed and creates recirculation of liquid to the bed above. Since liquid contact is the purpose of the packing therebeneath, such a result totally frustrates the intent of the liquid distributor. As much as 5% of the liquid flowing through a nozzle can be converted to mist at a pressure drop of 20 psi. It has also been noted that spray nozzle equipped pipe distributors produce overlapping spray patterns which result in increased flow in certain areas with reduced flow in other areas.

These issues are important as are the number of liquid distribution points necessary for various tower diameters, packing heights, process materials and system parameters. For example, it is critical that the packing height not be too great because unwanted liquid and vapor concentration gradients can develop. Also the weight of the packing will cause deformation of the packing itself. However, liquid redistributors between packing sections are expensive and take up heights that could otherwise be used for mass transfer. One consideration is the type of packing being used. Structured packing can tolerate very little mal-distribution while dump packing, on the other hand, can sustain larger variations in liquid distribution. It would be an advantage, therefore, to provide means for even liquid and vapor distribution prior to entry of said vapor and liquid into the packing bed and in a manner providing both a uniform spread of said liquid and vapor and uniform volumetric distribution thereof.

The present invention provides such an improved system of vapor-liquid distribution through a distributor and drip point multiplier assembly. A distributor is constructed with a plurality of discharge ports and/or discharge members such as drip tubes that depend below the bottom region thereof so as to prevent disturbing the rising vapor flow at the point of liquid discharge. In one embodiment, a drip tube is constructed with a first, generally U-shaped mounting channel secured to the side of the distributor trough with at least one hole formed therethrough in flow communication with the lower region of the trough. An angular distributor pipe channel is constructed for slidable engagement with the U-shaped channel and a multi-port distributor plate is secured to the end thereof. In this manner the advantages of distributor tubes are provided in an assembly wherein the number of drip points beneath each tube is symmetrically multiplied for even liquid distribution therefrom.

SUMMARY OF THE INVENTION

The present invention pertains to liquid distribution systems adapted for uniformly distributing liquid flow through a process tower. More particularly, one aspect of the invention comprises an improved liquid distributor for process columns of the type wherein vapor is injected into the column for ascension therethrough and liquid is dispersed in the column for downward flow. Packing sections, or beds, are disposed in the tower for facilitating the interaction of vapor and liquid passing in counter-current flow therethrough. The improvement comprises a liquid flow distributor and horizontally disposed drip point multiplier assembly adapted for positioning above the packing section for the even distribution of liquid downwardly therethrough. The distributor comprises liquid flow members having a plurality of ports for the select discharge of liquid therefrom. A distributor plate is secured horizontally relative to a port for receiving the liquid discharge therefrom. The horizontal distributor plate collects the liquid discharge and generates a plurality of additional drip points, which drip points may be symmetrically spaced therearound. The discharge from the distributor plate produces, in accordance with the design, multiple drip points of liquid with a lower falling velocity of the liquid on the underlying packing section than would result from direct discharge from a single port in the flow member.

In another aspect the invention includes the liquid distributor described above wherein the liquid flow members are formed with a plurality of drip tube assemblies secured thereto with holes formed therein for spewing liquid outwardly therefrom. The drip tubes are provided in flow communication with the holes. The drip tubes may be removable from, or fixed to the body section, and the horizontally disposed distributor plates that are secured beneath the drip tubes may include a generally rectangular member having sidewall portions facilitating the generation of a preselected head of liquid therein. The rectangular member further includes a plurality of apertures which drain the liquid collected therein to thereby generate a multitude of additional, symmetrically disposed drip points beneath the distributor. In yet a further aspect, the invention includes a method of distributing liquid with the distributor plate assembly described above.

BRIEF DESCRIPTION OF THE DRAWINGS

For a more complete understanding of the present invention and for further objects and advantages thereof, reference may now be had to the following description taken in conjunction with the accompanying drawings in which:

FIG. 4 is an enlarged perspective view of the flow distributor array of the present invention illustrating a multitude of distributor tube assemblies secured thereto in accordance with the principles of the present invention;

FIG. 5 is an enlarged exploded, perspective view of a drip tube from the assembly of FIG. 4 illustrating one method of attachment of a distributor plate to a removable drip tube mounting channel;

FIG. 6 is a perspective view of an alternative embodiment of the drip tube assembly of FIG. 5 illustrating an alterative means of attachment of the distributor plate directly to a sliding drip tube;

FIGS. 7A and 7B are perspective views of alternative embodiments of the distributor plate attachment means shown in FIG. 6;

FIG. 9 is a perspective view of an alternative embodiment of the distributor plate of FIG. 7 illustrating a plurality of drip guides formed within the plate;

FIG. 10 is a perspective view of an alternative embodiment of the distributor plate assembly of FIG. 9 with enlarged drip guides;

FIG. 11 is a perspective view of an alternative embodiment of the distributor plate of FIG. 7 illustrating an alternative bottom construction;

FIG. 12 is a perspective view of an alternative embodiment of a distributor plate constructed in accordance with the principles of the present invention;

FIG. 13 is an alternative embodiment of the distributor plate of FIG. 12 constructed with drip guides formed thereon.

DETAILED DESCRIPTION OF THE PREFERRED EMBODIMENT

Figure 1:
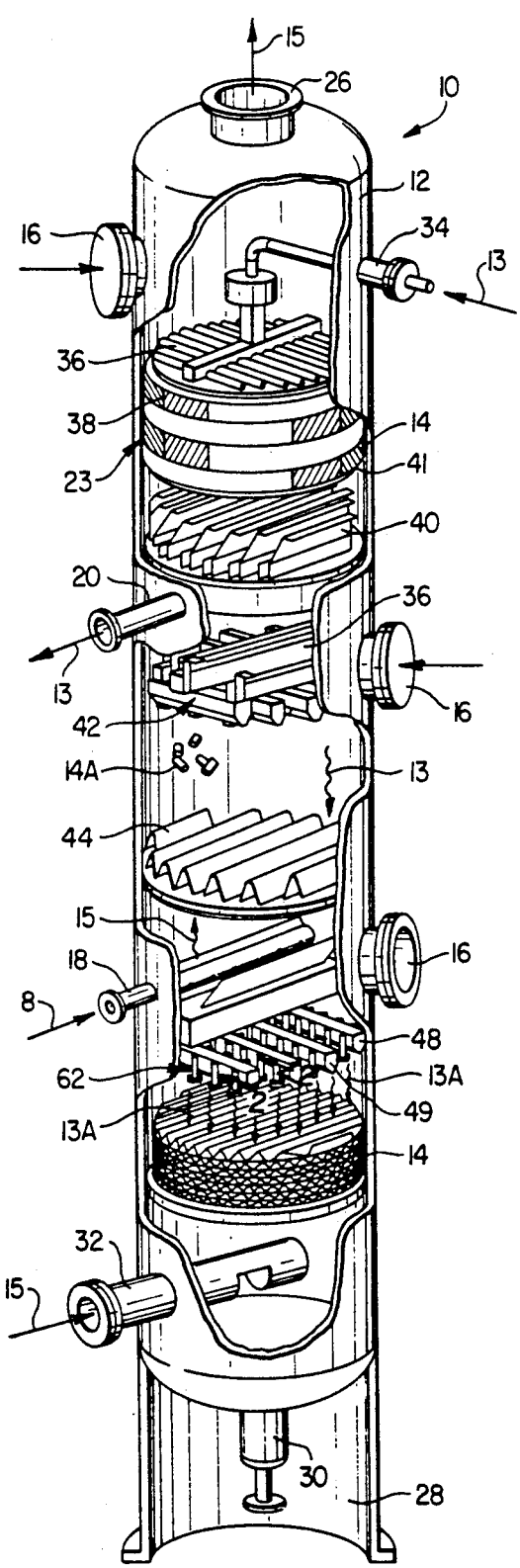
FIG. 1 is a perspective view of a packed column with various sections cut away for illustrating a variety of tower internals and one embodiment of a liquid flow distributor trough constructed in accordance with the principles of the present invention disposed therein.

Referring first to FIG. 1, there is shown a perspective view of a packed exchange tower or column with various sections out away for illustrating a variety of internals and the utilization of one embodiment of the liquid distributor of the present invention. The exchange column 10 of FIG. 1 comprises a cylindrical tower 12 having a plurality of packing bed layers 14 disposed therein. A plurality of manways 16 are likewise constructed for facilitating access to the internal region of the tower 12 for replacement of the packing beds 14. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower. Feed 8 is introduced at an intermediate point in the tower. Vapor in the feed 8 flows upwardly and liquid flows downwardly. Liquid ultimately leaves the tower at bottom stream draw off line 30. An intermediate draw off stream 20 may be drawn at an intermediate point in the tower. In its downward flow, the liquid 13 is depleted of some light material which evaporates from it as it passes through the packing beds, and is enriched or added to by heavy material which condenses into it out of the vapor stream.

Still referring to FIG. 1, the exchange column 10 further includes a vapor outlet, overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor herein upwardly through the packing layers 14. Reflux from condensers is provided in the upper tower region 23 through entry conduit 34 wherein reflux is distributed throughout a liquid distributor 36 across upper packing bed 38. It may be seen in this illustration that the upper packing bed 38 is of the structured packing variety, although the system will operate in a similar way with random packing. The regions of the exchange column 10 beneath the upper packing bed 38 are shown for purpose of illustration and include a liquid collector 40 disposed beneath a support grid 41 in support of the upper structured packing 38. A liquid redistributor 42 is likewise disposed therebeneath, and an intermediate support plate 44 is provided in an alternative configuration of the type adapted for supporting random packing 14A of a ring or saddle variety as representatively shown. A lower distributor assembly 48 incorporating the principles of the present invention is also illustrated beneath side stream feed input line 18. The distributor 48 comprises a plurality of troughs 49 adapted for dispersing the liquid 13 thereacross in counter-current flow to the ascending vapor therebeneath. Each trough 49, of this particular embodiment shown, is constructed with a plurality of drip tube assemblies 62 which discharge multiple streams of liquid 13A from distributor plate assemblies secured thereto. It may be seen from this figure that the counter-current configuration between the ascending vapor 15 and the descending liquid 13 is the subject of a plurality of critical design considerations including liquid/vapor ratios, physical and thermodynamic properties, liquid cooling, foaming and the presence of solids or slurries therein. Corrosion is likewise a consideration of the various elements in the packed towers and the selection of the material in the fabrication of the tower internals is in many instances the result thereof. The anatomy of the packed column as shown in FIG. 1 is likewise described in more detail in an article by Gilbert Chen entitled "Packed Column Internals" appearing in the Mar. 5, 1984 edition of *Chemical Engineering* incorporated herein by reference.

The present invention pertains to a liquid distributor, drip point multiplier. For purposes of discussion, the use of the drip point multiplier will mainly be shown in association with drip tube assemblies. However, such discussion is not meant to be limiting as to the application of such a drip point multiplier, which unit is most often referred to herein as a distributor plate.

Figure 2:
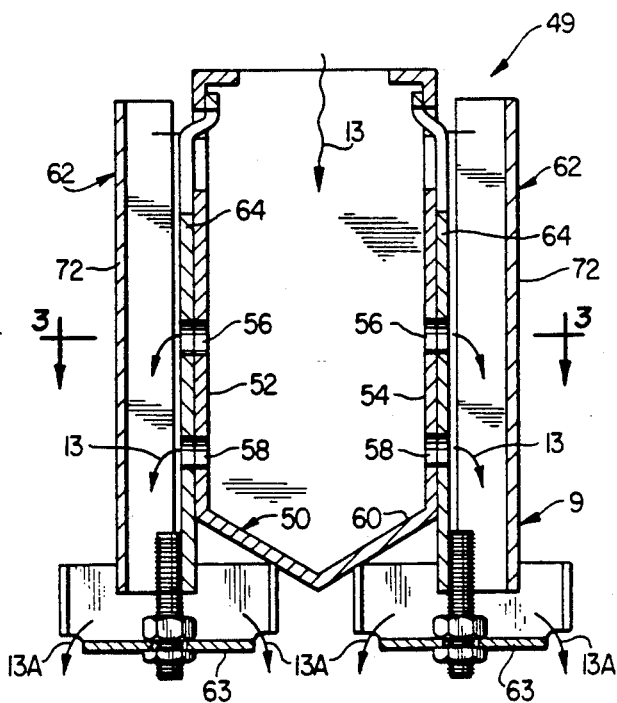
FIG. 2 is an enlarged side elevational, cross-sectional view of the liquid flow distributor trough of FIG. 1 taken along lines 2—2 thereof, having a plurality of distributor tube assemblies on opposite sides thereof and constructed in accordance with the principles of the present invention.

Referring now to FIG. 2, there is shown an enlarged end elevational cross-sectional view of a trough 49 having a lower body section 50. The trough section 50 is comprised of outer walls 52 and 54 upstanding from a bottom surface 60. A series of upper apertures 56 and lower apertures 58 are formed in the side walls 52 and 54 for purposes of allowing liquid flow outwardly from the trough 49. Outward of the apertures 56 and 58 is a distributor tube assembly adapted for receiving the flow of liquid therefrom and channeling said liquid downwardly into a packing bed therebeneath (not shown). In the present embodiment, removable drip tubes are shown although permanent drip tubes with side or bottom mounting and a variety of sizes and shapes are contemplated herein. As shown herein, each tube assembly 62 comprises a modified U-shaped channel 64 and a slidably mounted V-shaped drip tube 72 therein, the assembly being secured to the side wall of the trough 49 by arc welding or the like. Beneath each tube assembly 62 is mounted, in a substantially horizontal position, a distributor plate 63. The plate 63 is constructed to multiply the number of drip points that each drip tube can provide.

Figure 3:
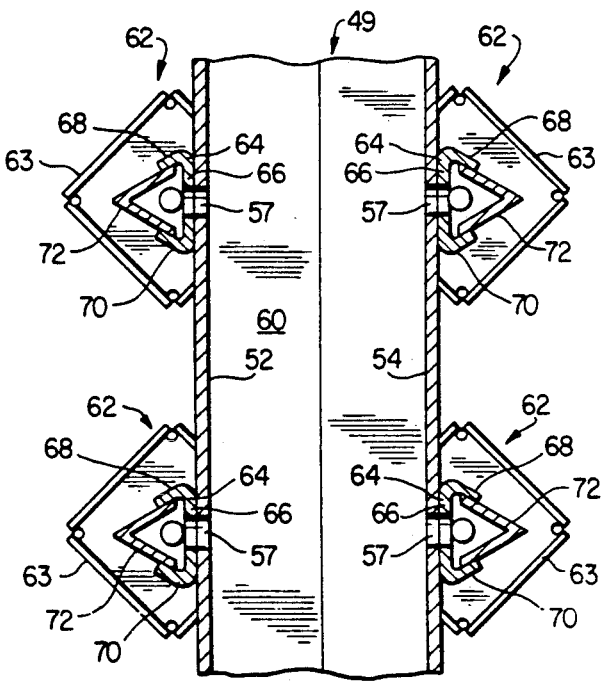
FIG. 3 is an enlarged top plan, cross-sectional view of the trough of FIG. 2 taken along lines 3—3 thereof and illustrating the placement of the distributor tube assemblies therealong.

Referring now to FIG. 3, the mounting channel 64 is constructed with a substantially planar base wall 66 and two upstanding side wall lips 68 and 70. Also shown is an aperture 57 formed in base wall 66 in line with aperture 56 and an aperture 59 formed in base wall 66, in line with aperture 58. A generally V-shaped channel 72 of mating size is received within the U-shaped channel 64 in slidable engagement therewith providing the necessary assemblage for serving as a flow distributor drip tube that is both efficient and removable. The removability aspect is discussed in U.S. Pat. No. 4,909,967, assigned to the assignee of the present invention. Most clearly shown herein is a distributor plate 63 constructed in accordance with the principles of the present invention. Each distributor plate 63 is disposed at the end of a tube assembly 62. The plate 63 may be constructed in a number of configurations adapted for being horizontally disposed beneath the tube assembly 62 for receiving the vertical flow of liquid from the tube assembly 62 and distributing the flow horizontally across the body of the plate for discharge through apertures formed therein.

Referring still to FIG. 3, there is shown a top plan view of the distributor trough 49 of the present invention wherein a plurality of drip tube assemblies 62 and distributor plates 63 are shown. The bottom 60 is shown between the apertures 57 of walls 52 and 54. The tube assemblies 62 are each secured to the outer walls 52 and 54, from which distributor plate 63 is secured for providing the necessary flow channeling and lateral flow distribution thereacross. The V-shape of channel 72 and modified U-shape of channel 64 is most clearly shown in this particular illustration although various channel and tube shapes (including permanent tubes) are contemplated in accordance with the principles of the present invention. Likewise, a myriad of configurations of the flow plate 63 are likewise anticipated in accordance with the principles of the present invention.

Referring now to FIG. 4, there is shown a plurality of troughs 49 constructed in accordance with the principles of the present invention and secured one to the other into an array 74 by frame network 75. It may be seen that each of the distributor troughs 49 are constructed with a plurality of drip tube assemblies 62, aligned one with the other. In operation, the drip tube assembly 62 confines the discharge of liquid 13 to maintain a controlled downward flow. The downward flow of liquid 13 is interrupted in the drip tube assembly itself which provides a member, in the form of plate 63, for the collection, intermittent stabilization and multi-port distribution and discharge of liquid 13A. In this manner, the liquid 13 descending within the drip tube assembly 62 is accumulated in a manner that reduces its kinetic energy and increases its initial spread across the underlying packing bed. In this manner, the liquid 13A discharged therefrom through multiple ports engages the underlying packing bed in a larger number of streams, with less velocity, with less kinetic energy, in much smaller quantities, and in a symmetrical pattern thereacross. This type of distribution, as compared to prior art drip tube distributors, has a number of marked advantages.

The distribution of liquid onto a packing bed requires a symmetrical dispersion of said liquid thereacross. Without symmetrical dispersion, uneven flow, resulting in mal-distribution will occur. The design of distributor troughs, drip tubes and the drip tube distributor of the present invention thus requires attention to the issue of symmetry therein. Prior art systems which incorporate a plurality of drip points along the side of the distributor trough may effectively increase the number of drip points, but there must be caution to carefully align the drip point terminals to maintain symmetry. Without the utilization of a separate collection member, the kinetic energy of the descending liquid can further create complications. The present invention provides a liquid collection member which is constructed with a plurality of apertures affording symmetrical distribution of liquid beneath the trough and atop the packing bed, with a much larger number of liquid streams than can be provided with conventional porting members such as drip tubes alone. This is accomplished with minimal liquid velocity due to the "intercept and pause" effect of the liquid coming from the distributor through the drip tubes.

Referring now to FIG. 5, there is shown trough 100 constructed with a V-shaped bottom 102. The side walls 104 are constructed in a generally vertical orientation and adapted for receiving the generally U-shaped mounting bracket 106 secured thereagainst. The mounting bracket 106 includes side walls 108 adapted for receiving a distributor channel therein as illustrated in FIGS. 1–4 above. In this and certain following figures, the distributor channel will not be illustrated for purposes of clarity.

Still referring to FIG. 5, the lower section of the mounting bracket 106 is constructed with a opening 110 disposed between side walls 108. Above opening 110 an aperture 112 is formed through the side walls 104 of the trough 100 for the discharge of liquid therefrom. The liquid passing down the mounting bracket 106 is then engaged by a horizontally disposed distributor plate and permitted to flow around and through the opening 110 as discussed in more detail below. A pair of mounting tabs 114 are disposed beneath the opening 110 and are adapted for engaging mating slots 116 formed in the distributor plate 118 disposed therebelow. The distributor plate is constructed for mating engagement with the particular distributor mounting bracket 106 or distributor channel as will be discussed herein.

Referring still to FIG. 5, distributor plate 118 is constructed with side walls 120. The side walls 120 terminate along corner edges 122 which are turned upwardly to form a container therein. The bottom of the container 123 is constructed with a plurality of apertures 124. The apertures 124 of the present embodiment are disposed near the corners 122 and are adapted for distributing liquid housed therein. Balanced distribution of any liquid accumulations is also provided by the V-shaped notch disposed along the top of each corner 122, which provides an overflow area about each corner. In its assembled configuration, the distributor plate assembly 63 appears as that shown in FIGS. 2–4 referenced above. However, a myriad of plate designs and mounting configurations are possible in accordance with the principles of the present invention.

Referring now to FIG. 6, there is shown an alternative embodiment of the drip tube distributor assembly of FIG. 5 wherein a drip tube channel is secured in a U-shaped mounting member 130. The channel 132 comprises, in this particular configuration, a generally V-shaped channel having legs 134 depending downwardly therefrom. Beneath each leg 134 is a mounting tab 136. The mounting tab 136 is separated from the leg 134 by a shoulder portion 138 which creates a spacer in the mounting of the leg within the distributor plate thereatneath.

Still referring to FIG. 6, the distributor plate 139 of this particular embodiment includes a pair of angulated slots 140 aligned in registry with the drip tube legs 134. The tabs 136 are thus received within the slots 140. Also formed in the bottom of distributor plate 139 are a plurality of discharge apertures 142. In the present embodiment these apertures 142 are disposed in the corner regions. The distributor plate further includes a plurality of side walls 146 which are folded upwardly to form a member 144 therewithin. The member 144 is adapted for accumulating liquid discharged downwardly through the distributor tube 132 and for the distribution of said liquid through the apertures 142. An advantage of this particular configuration is the ability to retro-fit existing distributor troughs having drip tube assemblies already installed but without distributor plates. By removing the existing drip tubes from the mounting channels 130 and replacing the drip tubes, the improved drip tube 132 and distributor plate 139 assembled thereto may provide the advantages afforded the present invention in a retro-fit configuration.

Referring now to FIG. 7A, there is shown an alternative embodiment of the mounting configuration of the distributor plate 150 to the drip tube assembly 152. The assembly 152 comprises the mounting member 154, as described above, in conjunction with the drip tube channel 156. In this particular configuration, the channel 156 comprises a generally V-shaped member having a threaded mounting member depending therefrom. Threaded mounting member 158 is secured to the central wall of the drip tube member 156 by welding or the like, and it depends therefrom for direct securement to the mounting plate 150. In order to provide a space between the distributor channel 156 and the bottom of the distributor plate 150, a spacer is provided in a form of nut 160 which may be threaded upon the threaded mounting member 158. An aperture 162 is likewise shown in the bottom portion of the distributor plate 150 positioned in registry with the threaded mounting member 158. A nut 161 is disposed beneath aperture 162 for securement of the distributor plate 150 thereagainst. In this configuration, liquid discharged from the distributor channel 156 is permitted to flow within the distributor plate 150 beneath the distributor channel 156 and outwardly to the distributor apertures formed therein as discussed above.

Referring now to FIG. 7B, there is shown an alternative embodiment of the drip tube assembly of FIG. 7A wherein the threaded mounting member is secured to the mounting plate. In the present embodiment, a drip tube mounting plate 172 is secured directly to the distributor trough 100. A threaded stud 174 depends downwardly from the mounting member 172 and is secured thereto by welding of the like. A spacer nut 176 is mounted on the threaded member for providing a mounting spacing as discussed above. An aperture 178 is formed in the distributor plate 171 for mounting on the stud 174. A mounting nut 177 is disposed thereabeneath for securing said mounting plate to said stud. Distributor holes 180 are formed in four corners of the distributor plate for distribution of liquid therefrom. This particular assembly illustrates a separate attachment mechanism for positioning the distributor plate 171 beneath the drip tube mounting bracket 172. With such a configuration, the drip tube mounting bracket 172 may be constructed with a solid back wall 182 as shown herein. The discharge of liquid from the mounting bracket 172 to the plate 170 is facilitated by the spacer member 176 as described above.

Figure 8B:
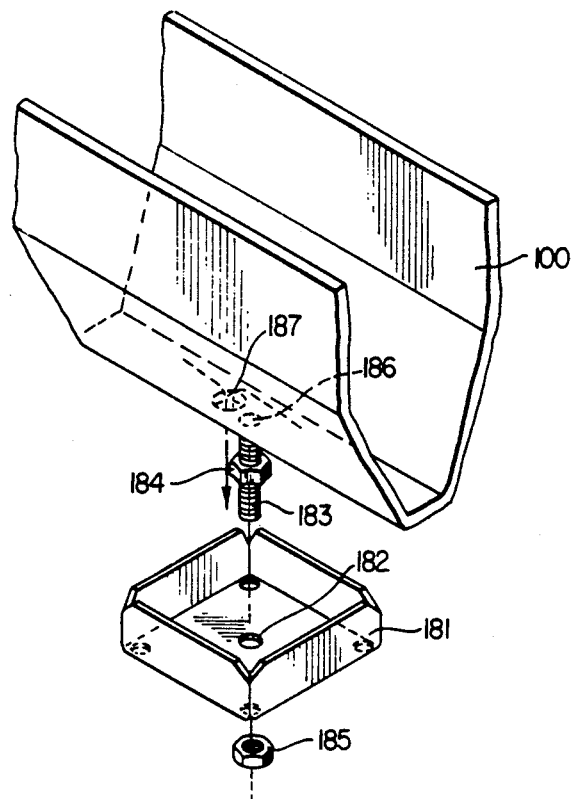
FIGS. 8A and 8B are perspective views of alternative embodiments of distributor plate mountings and the attachment means therefor.
Figure 8A:
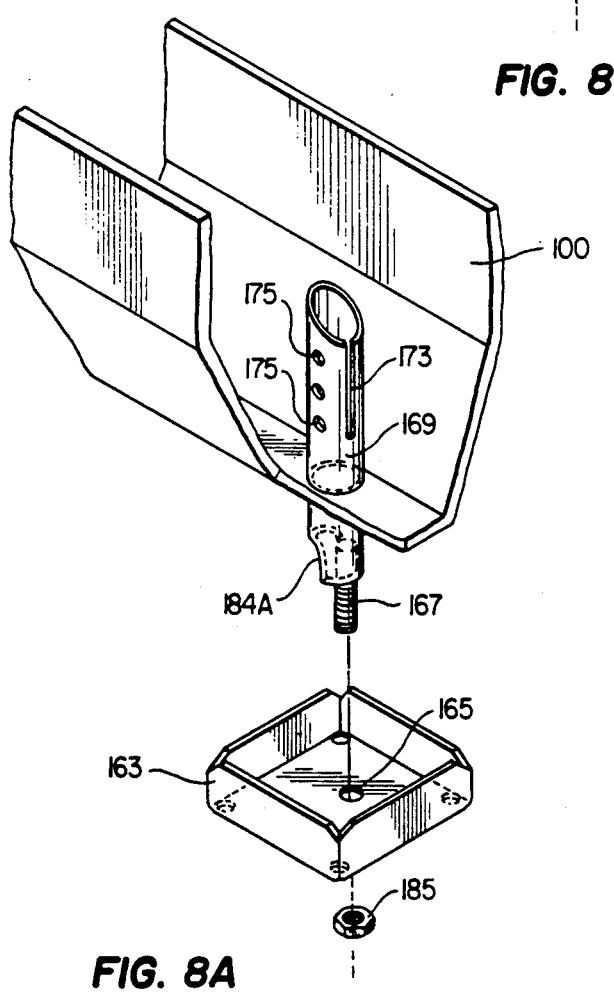

Referring now to FIG. 8A, there is shown a distributor trough 100 with a modified drip tube assembly and distributor plate secured thereto. Distributor plate 163 is constructed with an aperture 165 adapted for receiving a threaded member 167 therethrough. Threaded member 167 is affixed to a drip tube 169 of the type adapted for extending downwardly from the bottom region of trough 100. The drip tube 169 is constructed with an overflow notch 173 and overflow holes 175 adapted for receiving the flow of liquid from within the trough for distribution downwardly through the drip tube 169. In the present invention, the horizontal positioning and securement of the distributor plate 163 permits the downwardly traveling liquid to accumulate within, and be discharged from said distributor plate in multiple streams through the apertures formed therein. A single securement nut 185 may be utilized with the drip tube 169 because the tapered end configuration 184A may afford the requisite opening necessary for the discharge of liquid from said drip tube into the distributor plate 163. Other attachment means, such as the tabs shown in FIGS. 5 and 6 may also be used.

Referring now to FIG. 8B, there is shown an alternative embodiment of the attachment of a distributor plate directly beneath a distributor trough in accordance with the principles of the present invention. Distributor trough 100 is illustrated with a distributor plate 181 disposed immediately therebeneath. An aperture 182 is formed in the bottom of the distributor plate 181 and is adapted for receiving threaded member 183 therethrough. Spacing and securement nuts 184 and 185, respectively, are provided in association with the threaded member 183 for horizontal securement of the distributor plate 181 relative to the trough 100. Threaded member 183 is secured at point 186 to said trough at a position adjacent a discharge port, or aperture 187, formed in the bottom thereof. The discharge port 187 permits the discharge of liquid within the trough 100 to flow directly into the distributor plate 181 for collection therein and discharge from the multiple apertures formed therein, as described above. This illustration of direct mounting of the distributor plate 181 directly beneath, and in direct association with, the trough 100 is an illustration of yet another aspect of the present invention which affords the ability to multiply the number of drip points of a liquid distributor ordinarily having only a finite number of discharge ports therein.

Referring to FIGS. 7A and B and FIGS. 8A and B in combination, it should be noted that the distributor plate assemblies shown herein may be connected to the liquid distributors in a variety of mounting configurations. The present invention also contemplates the direct securement of said distributor plates to liquid distributor members which include distributor tube arrays, pipes, channels, and the troughs shown herein. If drip tubes are utilized, they may be spaced on opposite sides of the trough as shown in FIGS. 2 and 3 or directly beneath the trough as shown in FIG. 8A. In troughs with flat bottoms, a pair of distributor plates may be assembled in side by side relationship, wherein each distributor plate is fed by a separate distributor hole in the flat bottom of the distributor trough. Likewise, the terms "distributor trough" and "distributor members" include distributor pipes and other liquid distributor mechanisms conventional in process towers of the type adapted for carrying liquid to packing beds disposed therebeneath.

Referring now to FIG. 9, there is shown an enlarged perspective view of an alternative embodiment of a distributor plate 190 constructed in accordance with the principles of the present invention. The distributor plate 190 may be constructed for securement to the drip tube mounting bracket as shown in FIG. 7B, the drip tube channel, as shown in FIG. 7A, or the trough 100 as shown in FIG. 8B. For discussion purposes, a mounting directly to the drip tube channel, as shown in FIG. 7A, will be referred to for FIGS. 9-13. Consistent therewith, a centrally disposed mounting aperture is shown therein.

Still referring to FIG. 9, the distributor plate assembly 190 is constructed with a plurality of side walls 192. The bottom 193 is constructed with a central aperture 194 adapted for receiving, in mating engagement, a threaded mounting member from the drip tube as discussed above. In this particular configuration a spacer, such as the nut described above, would be utilized to provide a space between the bottom of the drip tube and the bottom plate surface 193. A central aperture 194 is disposed centrally of a plurality of apertures 196 which are disposed relatively close to the corners 197 for the even discharge of liquid therefrom. Depending from each aperture 196 is a drip guide, or deflector shield 198, which comprises a portion of the bottom 193 that has been punched and bent outwardly to form said deflector shield. With such a drip guide, the effect of ascending vapor is minimized during the initial discharge of liquid from the distributor plate 190. The design of and utilization of such deflector shields will be described in more detail below.

Referring now to FIG. 10, there is shown an alternative embodiment of a distributor plate having enlarged deflector shields. Distributor plate assembly 200 is thus shown with a plurality of enlarged deflector shields 202 distributed at each corner 204 of the distributor plate 200. Deflector shields 202 are positioned to protect and guide the discharged liquid that is emitted from apertures 206 formed in the bottom 207 of the distributor plate 200. A central aperture 208 is provided for mounting to the distributor tube as discussed above. In this particular configuration the enlarged deflector shields provide enhanced protection to the discharged liquid, as said liquid may be affected by ascending vapor in the tower during the operation of the distributor.

Referring now to FIG. 11, there is shown yet another alternative embodiment of a distributor plate illustrating a structural modification for enhancement of liquid distribution therein. Distributor plate assembly 210 is constructed with side walls 211 surrounding a bottom surface 212. The bottom surface 212 is constructed with a central aperture 214 adapted for mounting to a threaded member as discussed above. Outwardly of central aperture 214 are a plurality of corner apertures 216, adapted for the distribution of liquid from the distributor plate 210. The discharge apertures 216 are positioned relatively close to the corners 218 of the distributor plate 210, as also discussed above. In the present embodiment, the bottom 212 of the distributor plate 210 includes a series of indentations 220 forming a pattern of flow channels leading outwardly from central aperture 214 to corner apertures 216. The indentation of flow channels 220 forms a channel for the flow of liquid discharged from the drip tube which further enhances the equal distribution of said liquid through the four corner apertures 216. With low liquid flow rates, such channels 220 may find much utility. As in prior configurations, the side walls 211 are formed at the corners 218 with a V-shaped notch 222 adapted for providing a means for accommodating overflow from the distributor plate 210 in the event of high liquid flow rates.

Referring now to FIG. 12, there is shown a perspective view of an alternative embodiment of a distributor plate constructed in an x-shaped configuration. Distributor plate assembly 230 is constructed with four arms 231 each constructed with curved side wall portions 232 adapted for defining a controlled flow area therein. An aperture 234 is positioned at the end of each corner of the distributor plate 230 adapted for the discharge of liquid therefrom. A central aperture 236 is also provided for facilitating the mounting thereof to a threaded mounting member as discussed above. Shown in phantom are slots 238 which are shown for purposes of illustrating alternative means for mounting this particular configuration of the distributor plate to a drip tube having a tab array such as that shown in FIGS. 5 and 6. This particular embodiment of the drip tube plate may be constructed with additional modifications including a bottom portion 239 having an enhanced curvature for facilitating a small channel similar to that discussed in FIG. 11 for even distribution of liquid during low liquid flow rates. In accordance with the principles of the present invention, it may be necessary to provide means for equal distribution of liquid during low liquid flow rates for maintaining the efficiency of the operation therein.

Referring now to FIG. 13, there is shown an alternative embodiment of the x-shaped drip tube distributor of FIG. 12 with deflector shields, or drip guides, utilized therewith. The drip tube plate assembly 240 is constructed with four arms 242 adapted for the uniform discharge of liquid therefrom. A deflector shield or drip guide 244 depends from each arm 242 adjacent the discharge aperture 246. A central mounting aperture 248 is shown for mounting the distributor plate assembly to the drip tube assembly as discussed above. Likewise, mounting slots 249 are also shown in phantom for illustrating the position of such slots for mounting directly to the drip tube tabs as shown in FIGS. 5 and 6. Obviously the position of the drip tube tab slots, as well as the aperture for securement to a threaded member, may vary for alignment, depending on the nature of the connection.

Figure 14:
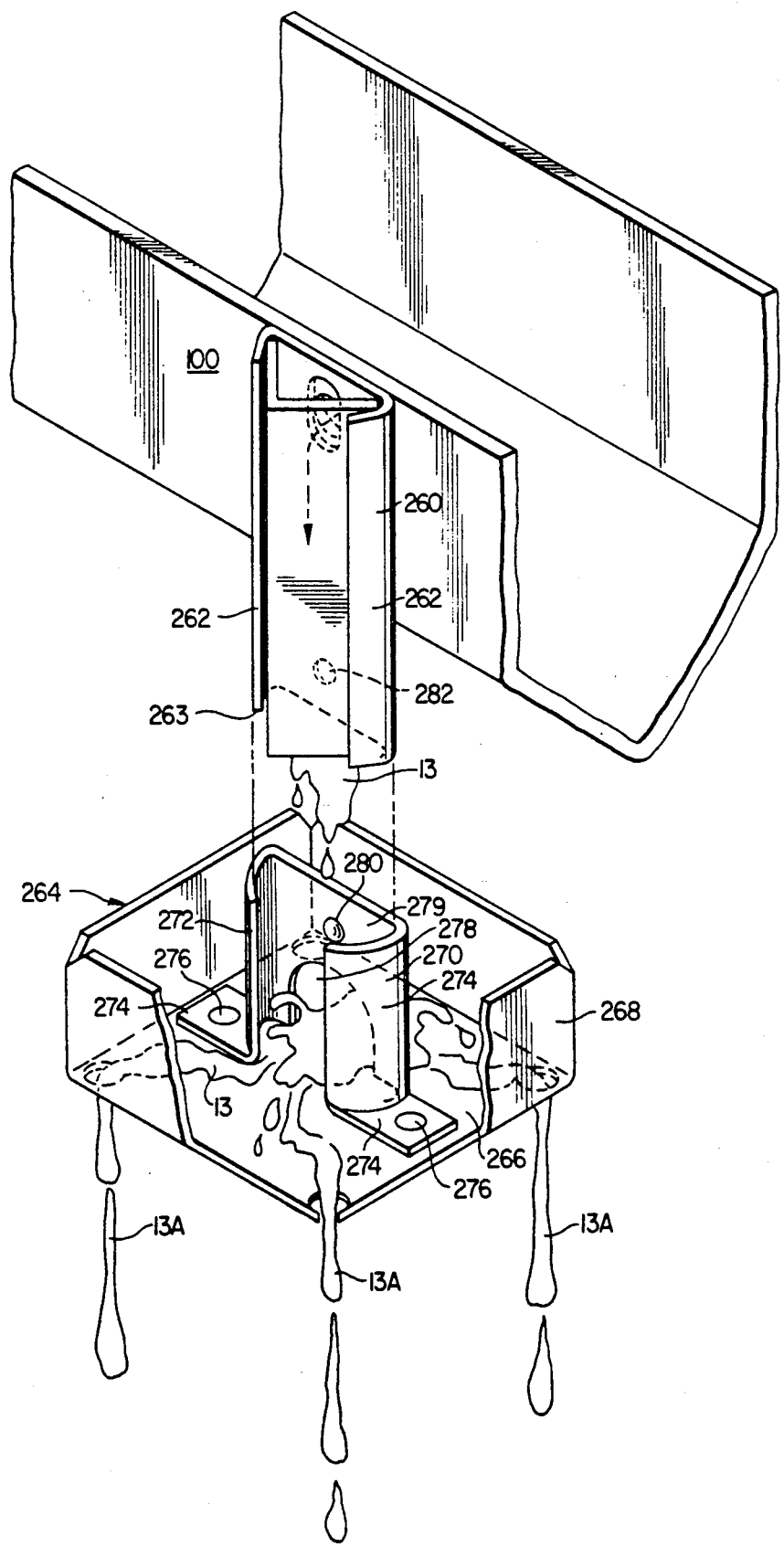
FIG. 14 is an enlarged fragmentary, perspective view of an alterative embodiment of the distributor plate of FIG. 5 illustrating an alternative means for mounting the distributor plate to a drip tube pipe.

Referring now to FIG. 14, there is shown an alternative embodiment of an attachment means for securing a drip plate to a drip tube. A drip tube U-shaped guide 260, of the type shown in FIGS. 6 and 7, is affixed to a distributor trough 100. The U-shaped guide has rolled side walls 262 terminating in an open bottom 263. Disposed beneath the guide 260 is a distributor plate 264, shown in a fragmentary perspective view for purposes of illustration. The distributor plate 264 includes a bottom 266 and side walls 268 of the type described above. In the present embodiment, an attachment means is provided in the form of mounting member 270. The mounting member 270 comprises upstanding engagement walls 274 constructed for matingly engaging the U-shaped guide 260, and, in particular, side wall lip portions 262 thereof. In accordance therewith, side wall portions 272 are formed of mating rolled curvature for slidable engagement therewith. Mounting flanges 274 extend outwardly from the base thereof and are secured to the bottom 266 by fastener means 276. Opening 278 is provided in the back wall 279 of mounting member 270 to permit the flow of liquid therethrough. A mounting detent 280, comprising a dome-shaped protuberance or the like, is constructed in the wall 279 and adapted for mating engagement with a mating detent 282, comprising a concave recess, formed in the U-shaped guide 260. By interlocking engagement of detent 280 and 282, the mounting member 270 is effectively secured in engagement with the U-shaped guide 260 for securing the distributor plate 264 therebeneath and in flow communication therewith. It should be noted that any conventional interconnection assembly would suffice in place of detents 280 and 282, and that such an interconnection assembly could be used to connect the distributor plate to other regions of the trough. In such mounting configurations, liquid 13 from the distributor trough 100 is effectively protected. As shown herein, the liquid 13 slows downwardly within the U-shaped guide 260 and the appropriate drip tube channel (not shown in this particular view) which engages the distributor plate 264. As the liquid 13 flows across the distributor plate, it is protected from the velocity of the ascending vapor within the process tower, and uniform liquid flow is facilitated by virtue of careful alignment of the distributor plate in a horizontal configuration to permit even flow of liquid therewithin and discharge through the apertures thereof. As discussed above, this assembly facilitates improved liquid distribution upon the packing beds lying therebeneath, as shown by the multiple liquid drip point streams 13A.

In operation, the present invention affords means for intercepting the discharge of liquid from a port in a distributor trough allowing said liquid to be evenly distributed across a substantially horizontal plane relative to the underlying packing, and controlled, low velocity, multiple point discharge therefrom. All of this liquid control is provided in a configuration sheltered from the ascending vapor within the tower, which ascending vapor can disturb the flow of liquid causing mal-distribution in the underlying packing regions. The position of the distributor plate beneath the flow member, as shown in FIGS. 8A and 8B has the additional advantage of less effect on free area than when the multiplier is at the sides. It is for this reason that the size and position of the apertures within the distributor plates is a significant design consideration. Symmetry within the tower must be maintained and, therefore, the position, spacing and size of each distributor plate, as well as the drip tubes themselves, must meet the distribution criteria established for a particular tower performance. In the discussion above and as the drawings illustrate, a variety of drip point multiplier plate configurations are presented for purposes of illustrating the principles of the present invention. Modifications may be made thereto for such purposes of symmetry and flow balance as are necessary to meet the performance parameters established for a particular tower. Such performance parameters are not discussed herein.

It is thus believed that the operation and construction of the present invention will be apparent from the foregoing description. While the method and apparatus shown or described has been characterized as being preferred, it will be obvious that various changes and modifications may be made therein without departing from the spirit and scope of the invention as defined in the following claims.

We claim:

1. An improved liquid flow distributor for a process column of the type wherein said distributor comprises a plurality of liquid flow members horizontally positioned above a packing section for the distribution of liquid downwardly therethrough, said flow members being constructed with ports formed therein for discharging said liquid therefrom, and said improvement comprising:

a plurality of separate distributor plates disposed beneath said flow members and horizontally secured in association with individual ones of said ports for select orientation and collection of the discharge of liquid therefrom;

said separate plates being formed so that the greatest linear distance between any two oppositely disposed points on each of said plates is on the order of less than twice the width of said flow member; and said separate plates also being formed with means for distributing liquid horizontally thereacross and discharging said liquid downwardly from a plurality of individual drip points formed on each of said separate plates and associated with individual ports.

2. The apparatus set forth in claim 1 wherein said separate distributor plate comprises a generally rectangular housing having a width no greater than the distance between said ports of said flow members and disposed horizontally above said packing section and constructed with a plurality of apertures therein or establishing said drip points therefrom.

3. The apparatus as set forth in claim 2 wherein said apertures are disposed in opposite corners of said rectangular housing.

4. The apparatus as set forth in claim 3 wherein said corner apertures are constructed with drip guides extending downwardly therefrom.

5. An improved liquid flow distributor for a process column of the type wherein said distributor comprises a plurality of liquid flow members horizontally positioned above a packing section for the distribution of liquid downwardly therethrough, said flow members being constructed with ports formed therein for discharging said liquid therefrom, and said improvement comprising:

a plurality of distributor plates horizontally secured in association with said ports for collecting the discharge of liquid therefrom;

said plates being formed with means for distributing liquid horizontally thereacross and discharging said liquid downwardly from a plurality of drip points thereon;

comprising distributor troughs formed with opposite side wall body sections, said troughs being constructed with a plurality of distributor tubes disposed outwardly of said side wall body sections; and said distributor plates being secured to single ones of said distributor tubes by connecting means.

6. The apparatus as set forth in claim 5 wherein said connecting means includes at least one tab member extending from said distributor tube into said distributor plate.

7. The apparatus as set forth in claim 5 wherein said distributor tubes comprise a first mounting member secured to said trough and a second channel member adapted for interlocking engagement of said first mounting member, and wherein said distributor plate is adapted for securement to said second channel member.

8. The apparatus as set forth in claim 5 wherein said distributor tubes comprise a first mounting member secured to said trough and a second channel member adapted for interlocking engagement of said first mounting member, and wherein said distributor plate is adapted for securement to said first mounting member.

9. An improved liquid flow distributor for a process column of the type wherein said distributor comprises a plurality of liquid flow members horizontally positioned above a packing section for the distribution of liquid downwardly therethrough, said flow members being constructed with ports formed therein for discharging said liquid therefrom, and said improvement comprising:
a plurality of distributor plates horizontally secured in association with said ports for collecting the discharge of liquid therefrom;
said plates being formed with means for distributing liquid horizontally thereacross and discharging said liquid downwardly from a plurality of drip points thereon; and
a generally x-shaped member having a plurality of arms extending outwardly from single ones of said plates, said arms having apertures formed therein for the discharge of liquid downwardly therefrom.

10. In a liquid distributor of the type adapted for distributing liquid from a liquid flow member having more than one liquid discharge port to an underlying packing bed in a process tower, a drip point multiplier assembly comprising a plurality of horizontally disposed means secured to said flow member, each individual one of said means being formed so that the greatest linear distance between any two oppositely disposed points on each of said means is on the order of less than twice the width of said flow member, and each of said means being associated with individual ones of said ports of said flow member for receiving and horizontally collecting liquid discharge from individual ones of said ports of said flow member and selectively discharging in a vertical direction said horizontally collected liquid from multiple discharge points in said collection means.

11. The apparatus as set forth in claim 10 wherein aid plurality of collection means each comprises a container adapted for securement to said flow member in select relationship to and for collecting liquid discharge from individual ones of ports of said flow member, said container being constructed with a plurality of apertures adapted for the select discharge of liquid therefrom.

12. The apparatus as set forth in claim 11 wherein said container comprises a generally rectangular housing constructed with a bottom portion and side wall regions upstanding therefrom.

13. The apparatus set forth in claim 12 wherein said rectangular housing is constructed with at least two apertures formed in opposite corners thereof for establishing said drip points therefrom.

14. The apparatus as set forth in claim 13 wherein said bottom portion of said housing includes an indented channel portion extending to said corner apertures.

15. The apparatus as set forth in claim 13 wherein said corner apertures are constructed with drip guides extending downwardly therefrom.

16. The apparatus as set forth in claim 11 wherein said flow member is constructed with a plurality of fluid discharge ports and individual ones of said container being secured to said flow member in a position vertically disposed beneath individual ones of said ports for the collection of liquid discharge therefrom.

17. The apparatus as set forth in claim 16 and further including a mounting member extending between said flow member and said container for mounting said container beneath said port.

18. The apparatus as set forth in claim 17 wherein said mounting member comprises a threaded stud connected at a first end to said flow member and at a second end to said container.

19. The apparatus as set forth in claim 10 wherein said collection means comprises a horizontally disposed plate secured to said flow member by a threaded mounting member extending therebetween.

20. The apparatus as set forth in claim 10 wherein said collection means comprises a plate secured to said flow member by tab members extending therebetween.

21. In a liquid distributor of the type adapted for distributing liquid from liquid flow members to an underlying packing bed in a process tower;
a drip point multiplier assembly comprising means secured to single ones of said flow members in a horizontal relationship therewith for receiving and horizontally collecting liquid discharge from said flow member and discharging in a vertical direction said horizontally collected liquid from multiple discharge points in said collection means; and
wherein said flow members comprise distributor troughs formed with opposite side wall body sections, said troughs being constructed with a plurality of distributor tube assemblies disposed outwardly of said side wall body sections and said distributor tube assembly comprising a first mounting member secured to said trough and a second channel member adapted for engaging said first mounting member in interlocking engagement therewith, said collection means comprising a distributor plate adapted for securement to said second channel member.

22. The apparatus as set forth in claim 21 wherein said distributor plate is adapted for securement to said first mounting member.

23. An improved method of distributing liquid in a process column of the type wherein liquid flow members are positioned vertically above packing sections to discharge streams of liquid therefrom through ports therein, the improvement comprising the steps of:
providing a plurality of separate distributor plates for positioning relative to said flow members and in association with individual ones of said ports for select orientation and collection of the discharge of liquid therefrom;
forming said distributor plates with the greatest linear distance between any two oppositely disposed points on each of said plates being on the order of less than twice the width of said flow member;

forming multiple drip points in said distributor plates;

securing individual ones of said distributor plates to said flow members in a horizontal position therebeneath and in association with individual ones of said ports for collecting the discharge of liquid therefrom;

distributing said collected liquid across said distributor plates; and discharging multiple streams of liquid from said drip points of said distributor to said packing sections therebeneath.

24. The method as set forth in claim 23 and including the step of forming said distributor plates with side wall portions for defining a liquid container therein and including the step of forming apertures in said container for the discharge of liquid therefrom.

25. The method as set forth in claim 24 and including the step of providing a mounting member, securing said mounting member to said flow member for the mounting of said container thereto, and securing said container to said mounting member horizontally therebeneath.

* * * * *

UNITED STATES PATENT AND TRADEMARK OFFICE
CERTIFICATE OF CORRECTION

PATENT NO. : 5,192,465
DATED : March 9, 1993
INVENTOR(S) : Petrich et al.

It is certified that error appears in the above-identified patent and that said Letters Patent is hereby corrected as shown below:

Column 2, line 61    delete "re" and insert --are--

Column 5, line 46    delete "out" and insert --cut--

Column 6, line 9     delete "herein" and insert --therein--

Column 14, line 41   delete "or" and insert --for--

Column 15, line 56   delete "aid" and insert --said--

Signed and Sealed this

Twenty-second Day of March, 1994

Attest:

BRUCE LEHMAN

Attesting Officer        Commissioner of Patents and Trademarks